United States Patent
Uy et al.

(10) Patent No.: US 7,671,489 B1
(45) Date of Patent: Mar. 2, 2010

(54) METHOD AND APPARATUS FOR SELECTIVELY MAINTAINING CIRCUIT POWER WHEN HIGHER VOLTAGES ARE PRESENT

(75) Inventors: Allan Paul T. Uy, Pasadena, CA (US); Richard Joseph McConnell, Rancho Cucamonga, CA (US)

(73) Assignee: SIRF Technology, Inc., San Jose, CA (US)

( * ) Notice: Subject to any disclaimer, the term of this patent is extended or adjusted under 35 U.S.C. 154(b) by 1505 days.

(21) Appl. No.: 10/051,726

(22) Filed: Jan. 17, 2002

Related U.S. Application Data

(60) Provisional application No. 60/264,533, filed on Jan. 26, 2001.

(51) Int. Cl.
*H02J 1/00* (2006.01)

(52) U.S. Cl. .............................. 307/86; 307/85; 307/87; 307/130

(58) Field of Classification Search ................. 307/87, 307/130, 65, 85, 86; 327/518, 520
See application file for complete search history.

(56) References Cited

U.S. PATENT DOCUMENTS

| | | | |
|---|---|---|---|
| 4,426,712 A | 1/1984 | Gorski-Popiel | |
| 4,445,118 A | 4/1984 | Taylor et al. | |
| 4,463,357 A | 7/1984 | MacDoran | |
| 4,578,678 A | 3/1986 | Hurd | |
| 4,667,203 A | 5/1987 | Counselman, III | |
| 4,701,934 A | 10/1987 | Jasper | |
| 4,754,465 A | 6/1988 | Trimble | |
| 4,785,463 A | 11/1988 | Janc et al. | |
| 4,788,450 A * | 11/1988 | Wagner | 307/64 |
| 4,809,005 A | 2/1989 | Counselman, III | |
| 4,821,294 A | 4/1989 | Thomas, Jr. | |
| 4,857,985 A * | 8/1989 | Miller | 307/127 |
| 4,890,233 A | 12/1989 | Ando et al. | |
| 4,894,662 A | 1/1990 | Counselman | |
| 4,998,111 A | 3/1991 | Ma et al. | |
| 5,014,066 A | 5/1991 | Counselman, III | |
| 5,036,329 A | 7/1991 | Ando | |
| 5,043,736 A | 8/1991 | Darnell et al. | |
| 5,108,334 A | 4/1992 | Eschenbach et al. | |

(Continued)

FOREIGN PATENT DOCUMENTS

EP 0511741 11/1992

(Continued)

OTHER PUBLICATIONS

Marketing Material: Qualcomm CDMA Technologies—Integrated Solutions—MGP6200™ Multimode GPS Processor (8 pages).

(Continued)

*Primary Examiner*—Albert W Paladini
*Assistant Examiner*—Hal I Kaplan
(74) *Attorney, Agent, or Firm*—Duane Morris LLP

(57) ABSTRACT

A method and apparatus for detecting the presence of a specified voltage source and automatically switching off a second voltage source regardless of voltage source potential of the two voltage sources are disclosed. The present invention uses pinch-off of a JFET, controlled by an inverter, to control a backup power supply based on the availability of the main supply.

12 Claims, 2 Drawing Sheets

U.S. PATENT DOCUMENTS

| | | | |
|---|---|---|---|
| 5,187,396 A * | 2/1993 | Armstrong et al. | 327/65 |
| 5,202,829 A | 4/1993 | Geier | |
| 5,225,842 A | 7/1993 | Brown et al. | |
| 5,293,170 A | 3/1994 | Lorenz et al. | |
| 5,311,195 A | 5/1994 | Mathis et al. | |
| 5,323,164 A | 6/1994 | Endo | |
| 5,343,209 A | 8/1994 | Sennott et al. | |
| 5,345,244 A | 9/1994 | Gildea et al. | |
| 5,347,536 A | 9/1994 | Meehan | |
| 5,379,224 A | 1/1995 | Brown et al. | |
| 5,402,347 A | 3/1995 | McBurney et al. | |
| 5,416,712 A | 5/1995 | Geier et al. | |
| 5,420,593 A | 5/1995 | Niles | |
| 5,440,313 A | 8/1995 | Osterdock et al. | |
| 5,450,344 A | 9/1995 | Woo et al. | |
| 5,504,684 A | 4/1996 | Lau et al. | |
| 5,592,173 A | 1/1997 | Lau et al. | |
| 5,598,041 A * | 1/1997 | Willis | 307/43 |
| 5,625,668 A | 4/1997 | Loomis et al. | |
| 5,663,734 A | 9/1997 | Krasner | |
| 5,663,735 A | 9/1997 | Eshenbach | |
| 5,781,156 A | 7/1998 | Krasner | |
| 5,784,626 A * | 7/1998 | Odaohara | 307/66 |
| 5,786,789 A | 7/1998 | Janky | |
| 5,812,087 A | 9/1998 | Krasner | |
| 5,825,327 A | 10/1998 | Krasner | |
| 5,828,694 A | 10/1998 | Schipper | |
| 5,831,574 A | 11/1998 | Krasner | |
| 5,841,396 A | 11/1998 | Krasner | |
| 5,845,203 A | 12/1998 | LaDue | |
| 5,854,605 A | 12/1998 | Gildea | |
| 5,874,914 A | 2/1999 | Krasner | |
| 5,877,724 A | 3/1999 | Davis | |
| 5,877,725 A | 3/1999 | Kalafus | |
| 5,883,594 A | 3/1999 | Lau | |
| 5,884,214 A | 3/1999 | Krasner | |
| 5,889,474 A | 3/1999 | LaDue | |
| 5,903,654 A | 5/1999 | Milton et al. | |
| 5,907,809 A | 5/1999 | Molnar et al. | |
| 5,917,444 A | 6/1999 | Loomis et al. | |
| 5,920,283 A | 7/1999 | Shaheen et al. | |
| 5,923,703 A | 7/1999 | Pon et al. | |
| 5,926,131 A | 7/1999 | Sakumoto et al. | |
| 5,936,572 A | 8/1999 | Loomis et al. | |
| 5,943,363 A | 8/1999 | Hanson et al. | |
| 5,945,944 A | 8/1999 | Krasner | |
| 5,963,582 A | 10/1999 | Stansell, Jr. | |
| 5,977,909 A | 11/1999 | Harrison et al. | |
| 5,982,324 A | 11/1999 | Watters et al. | |
| 5,987,016 A | 11/1999 | He | |
| 5,999,124 A | 12/1999 | Sheynblat | |
| 6,002,362 A | 12/1999 | Gudat | |
| 6,002,363 A | 12/1999 | Krasner | |
| 6,009,551 A | 12/1999 | Sheynblat | |
| 6,016,119 A | 1/2000 | Krasner | |
| 6,041,222 A | 3/2000 | Horton et al. | |
| 6,047,017 A | 4/2000 | Cahn et al. | |
| 6,052,081 A | 4/2000 | Krasner | |
| 6,061,018 A | 5/2000 | Sheynblat | |
| 6,064,336 A | 5/2000 | Krasner | |
| 6,104,338 A | 8/2000 | Krasner | |
| 6,104,340 A | 8/2000 | Krasner | |
| 6,107,960 A | 8/2000 | Krasner | |
| 6,111,540 A | 8/2000 | Krasner | |
| 6,131,067 A | 10/2000 | Girerd et al. | |
| 6,133,871 A | 10/2000 | Krasner | |
| 6,133,873 A | 10/2000 | Krasner | |
| 6,133,874 A | 10/2000 | Krasner | |
| 6,137,192 A * | 10/2000 | Staffiere | 307/130 |
| 6,150,980 A | 11/2000 | Krasner | |
| 6,185,427 B1 | 2/2001 | Krasner | |
| 6,208,290 B1 | 3/2001 | Krasner | |
| 6,208,291 B1 | 3/2001 | Krasner | |
| 6,215,441 B1 | 4/2001 | Moeglein | |
| 6,215,442 B1 | 4/2001 | Sheynblat | |
| 6,236,354 B1 | 5/2001 | Krasner | |
| 6,239,742 B1 | 5/2001 | Krasner | |
| 6,259,399 B1 | 7/2001 | Krasner | |
| 6,272,430 B1 | 8/2001 | Krasner | |
| 6,289,041 B1 | 9/2001 | Krasner | |
| 6,307,504 B1 | 10/2001 | Sheynblat | |
| 6,313,786 B1 | 11/2001 | Sheynblat | |
| 6,314,308 B1 | 11/2001 | Sheynblat | |
| 6,377,209 B1 | 4/2002 | Krasner | |
| 6,408,196 B2 | 6/2002 | Sheynblat | |
| 6,411,254 B1 | 6/2002 | Moeglein | |
| 6,411,892 B1 | 6/2002 | Van Diggelen | |
| 6,417,801 B1 | 7/2002 | Van Diggelen | |
| 6,420,906 B1 * | 7/2002 | Kohda | 326/114 |
| 6,421,002 B2 | 7/2002 | Krasner | |
| 6,429,814 B1 | 8/2002 | Van Diggelen et al. | |
| 6,433,731 B1 | 8/2002 | Sheynblat | |
| 6,453,237 B1 | 9/2002 | Fuchs et al. | |
| 6,462,434 B1 * | 10/2002 | Winick et al. | 307/85 |
| 6,462,926 B1 * | 10/2002 | Zaretsky et al. | 361/103 |
| 6,484,097 B2 | 11/2002 | Fuchs et al. | |
| 6,487,499 B1 | 11/2002 | Fuchs et al. | |
| 6,510,387 B2 | 1/2003 | Fuchs et al. | |
| 6,542,821 B2 | 4/2003 | Krasner | |
| 6,583,757 B2 | 6/2003 | Krasner | |
| 6,597,311 B2 | 7/2003 | Sheynblat | |

FOREIGN PATENT DOCUMENTS

| | | |
|---|---|---|
| GB | 2115195 | 1/1983 |
| JP | 58-105632 | 6/1983 |
| JP | 7-36035 | 5/1986 |
| JP | 4-326079 | 11/1992 |
| WO | WO 90/11652 | 10/1990 |

OTHER PUBLICATIONS

Marketing Material: uNav Microelectronics—uN9x18 Low Power, High Performance GPS Receiver Chipset/uN9x18 GPS Receiver Solution (9 pages).

Marketing Material: uNav Microelectronics, uN9x18 Low Power, High Performance GPS Receiver Chipset (2 pages).

Marketing Material: Global Locate—Hammerhead II™, Single Chip AGPS Solution (2 pages).

Marketing Material/Press Release: Broadcom Introduces Advanced Single-Chip GPS Solution for Mobile Applications (3 pages).

Marketing Material/White Paper: SnapTrack: A Qualcomm Company—SnapTrack's Wireless Assisted GPS™ (A-GPS) Solution Provides the Industry's Best Location System—Location Technologies for GSM, GPRS and WCDMA Networks (Qualcomm CDMA Technologies: Enabling the Future of Communications) (4 pages).

New Fast GPS Code Acquisition Using FFT, Electronic Letters, vol. 27 No. 2, pp. 158-160 (1991) (2 pages).

Novel Fast GPS/GLONASS Code Acquisition Technique Using Low Update Rate FFT, Electronic Letters, vol. 28 No. 9, pp. 863-865 (3 pages).

* cited by examiner

METHOD AND APPARATUS FOR SELECTIVELY MAINTAINING CIRCUIT POWER WHEN HIGHER VOLTAGES ARE PRESENT

CROSS-REFERENCE TO RELATED APPLICATIONS

This application claims priority under 35 U.S.C. §119(e) of U.S. Provisional Patent Application No. 60/264,533, filed Jan. 26, 2001, entitled "METHOD AND APPARATUS FOR SELECTIVELY MAINTAINING CIRCUIT POWER WHEN HIGHER VOLTAGES ARE PRESENT," by Allan Uy et al, which application is incorporated by reference herein.

BACKGROUND OF THE INVENTION

1. Field of the Invention

The present invention relates in general to a low voltage, low current, supply switching circuit, and in particular to a method and apparatus for selectively maintaining circuit power when higher supply voltages are present.

2. Description of the Related Art

Almost all modern electronics utilize memory or other circuits that require power even after system power is turned off. Such power is typically called backup power, and is used to maintain timekeeping and Random Access Memory (RAM) for such purposes as program storage and other data storage that may be needed when main power is restored. Backup power can also be used as a bridge for situations when main power is disabled for a short period of time to enable users to turn off devices in an orderly manner.

Typically, a battery or a small amount of current from the main supply that feeds a capacitor is used to provide this backup power. In mobile devices, where the device is not plugged into an electrical outlet, battery power is almost always used. As such, backup power requirements must include circuits that attempt to maximize the life of the battery used for backup power. Typically, a circuit is provided that switches the battery off, i.e., such that the battery is disconnected from the load, when the higher voltage main power supply is applied to the circuit.

As mobile devices, e.g., cellular telephones, Personal Data Assistants (PDAs), laptop computers, etc. are decreased in size and weight, smaller batteries are used, and therefore, such devices must also decrease power consumption. Further, such devices have added new features, e.g., call waiting in cellular telephones, internet access from PDAs, Global Positioning System (GPS) receivers used for location services in cellular telephones, laptop computers, and PDAs, etc. As such, the main circuitry, as well as circuitry that may need backup power, has increased, and, along with it, power consumption.

Typically, to decrease power consumption, supply voltages of the device are decreased. However, standard batteries are currently only available in pre-defined voltages (e.g. 1.5V, 3.0V). Therefore, it is possible that a desired decreased supply voltage falls in between two standard battery voltages, where only the higher voltage battery is usable in the design. This instance presents a problem for typical switching solutions, because the typical solution for switching the power may not turn the backup battery off when main power is applied.

It can be seen, then, that there is a need in the art for a method and apparatus that can provide backup power to electronic circuits on demand. It can also be seen that there is a need in the art for a method and apparatus that turns off the backup power supply whenever main power is on regardless of main power voltage. It can also be seen that there is a need in the art for a method and apparatus that can turn the backup power supply off even with additional circuitry attached to the backup circuits. It can also be seen that there is a need in the art for a method and apparatus for extending backup battery life in a device needing battery backup by automatically disconnecting the backup battery when the lower voltage main power source is activated.

SUMMARY OF THE INVENTION

To minimize the limitations in the prior art, and to minimize other limitations that will become apparent upon reading and understanding the present specification, the present invention discloses a method and apparatus for selectively maintaining circuit power when alternate higher voltage sources are present.

An apparatus in accordance with the invention comprises a field effect transistor, a first diode, a second diode, and an inverter. The field effect transistor is coupled to the secondary power source. The first diode is coupled between the field effect transistor and to a device to be powered, while the second diode is coupled between the primary power source and the device to be powered. The inverter is coupled to a gate of the field effect transistor, and maintains the field effect transistor in a pinched-off condition and prevents a current flow from the secondary power source when the primary power source is available.

It is an object of the present invention to provide a method and apparatus that can provide backup power to electronic circuits on demand. It is an object of the present invention to provide a method and apparatus that turns off the backup power supply whenever main power is on regardless of main power voltage. It is an object of the present invention to provide a method and apparatus that can turn the backup power supply off even with additional circuitry attached to the backup circuits. It is an object of the present invention to provide a method and apparatus for extending backup battery life in a device needing battery backup by automatically disconnecting the backup battery when the lower voltage main power source is activated.

BRIEF DESCRIPTION OF THE DRAWINGS

Referring now to the drawings in which like reference numbers represent corresponding parts throughout.

DETAILED DESCRIPTION OF THE DRAWINGS

In the following description of the preferred embodiment, reference is made to the accompanying drawings which form a part hereof, and in which is shown by way of illustration, a specific embodiment in which the invention may be practiced. It is to be understood that other embodiments may be utilized and structural changes may be made without departing from the scope of the present invention.

Overview of the Related Art

The present disclosure indirectly detects the presence of a specified voltage source and automatically switches off an undesired voltage source. Given a voltage source at a given level, detecting a source at a lower potential is straightforward; however, disabling the higher voltage source, once the lower voltage source has been detected, is not. This is due to the fact that the switch is usually controlled by the detection, and the detection is controlled and powered by the higher potential. This disclosure makes use of the presence of the higher potential source, without draining any current from it, in combination with presence of the preferred voltage source to effectively break the current path from the higher potential source to the main circuit.

Figure 1:
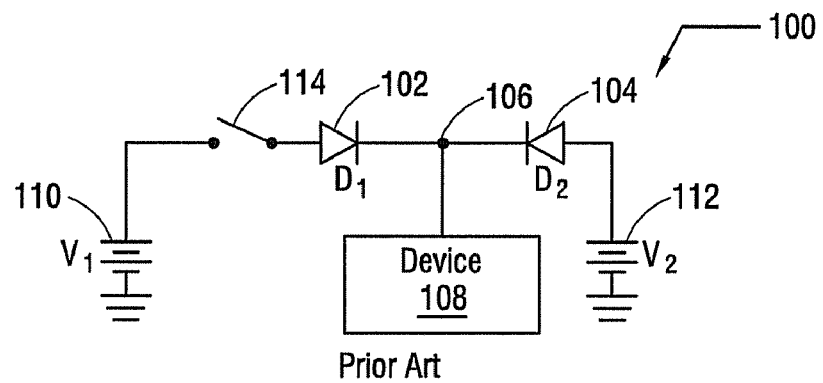
FIG. 1 illustrates the use of a dual Schottky diode device to automatically switch the voltage supply to the source with the higher potential as in the related art.

FIG. 1 illustrates the use of a dual Schottky diode device to automatically switch the voltage supply to the source with the higher potential as in the related art.

System 100 comprises diode D1 102 and diode D2 104 with the cathodes of D1 102 and D2 104 connected to a common node 106, which is used to provide power to device 108. Voltage source V1 110 includes the main power supply, and voltage source V2 112 includes the backup supply. V1 110 is connected to the anode of D1 102 through switch 114, and voltage source V2 112 is connected to the anode of D2 104.

In this configuration, when switch 114 is open, the higher voltage source that feeds node 106 can be V2 112, since no voltage from V1 110 is present. As such, backup supply V2 112 can provide power to device 108. When switch 114 is closed, whichever voltage supply has a higher potential, either V1 110 or V2 112, can provide power. If V1 110 is the higher supply, then V2 112 cannot be providing power, and can therefore have an extended life. However, if V1 110 is a lower voltage than V2 112, then V2 can continue to supply power to device 108. Since the current trend is to reduce main power voltages below that of standard batteries, such a circuit in the related art is not acceptable for increasing battery (e.g. V2 112) life.

Specifics of the [Disclosure]

Figure 2:
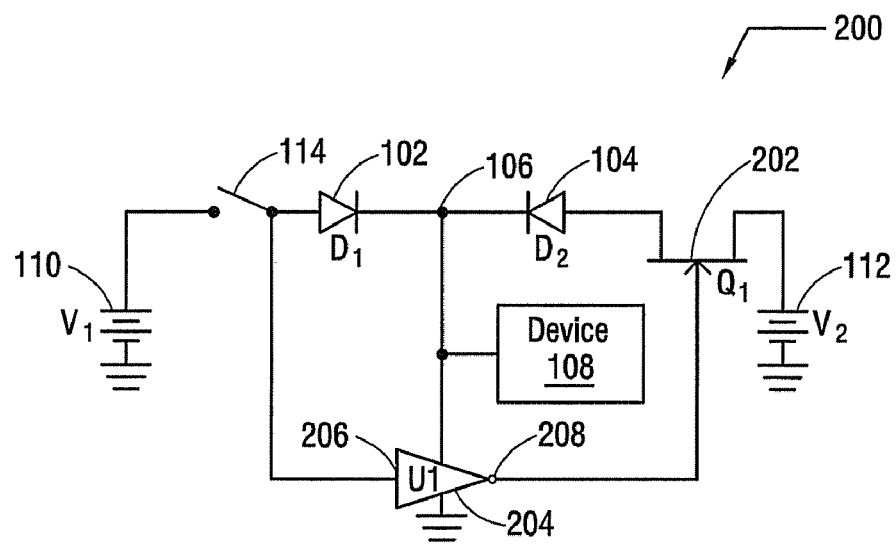
FIG. 2 illustrates the switching circuitry of the present invention which forces the use of a specific source irrespective of which source is at a higher potential.

FIG. 2 illustrates the switching circuitry of the present invention which forces the use of a specific source irrespective of which source is at a higher potential.

System 200 illustrates circuitry that comprises an N-channel Junction Field Effect Transistor (JFET) Q1 202 which is connected in series with the backup power supply V2 112. Such a transistor Q1 202 can have a fundamental characteristic such that the channel, i.e., the connection between the source and drain of Q1 202, is continuous and permits current flow in the absence of any gate voltage. Such a transistor is typically called a "normally on" or "depletion mode" FET.

A pinch-off condition, i.e., the disruption of current flow from source to drain, occurs when a voltage is applied at the gate of Q1 202 such that the voltage between the gate and the source of Q1 202, i.e., Vgs, reaches a specified negative voltage threshold. This threshold can be varied depending on the type of transistor used. In the pinch-off condition, the channel of the N-channel JFET prevents current flow.

When V2 112 is connected to the source of Q1 202 as shown in FIG. 2, current flow from V2 112 can be prevented by lowering the gate voltage present at Q1 202 to a point where Vgs exceeds the necessary threshold for a pinch-off condition to occur. Thus, when the desired voltage source V1 110 is present, it is desirable to have the gate of Q1 202 at zero volts (0V).

To achieve a 0V condition at the gate of Q1 202, an inverter U1 204 can be used, which is powered by the output of the diodes D1 102 and D2 104. The inverter U1 is controlled by the presence of the main source, i.e., V1 110, because of switch 114. When switch 114 is closed, and current is flowing from V1 110, U1 204 receives a positive voltage, at input 206, which then provides a negative or zero voltage at output 208 of U1 204 and thus to the gate of Q1 202, pinching-off Q1 202 and shutting off the current flow through Q1 202. This prevents current flow, and therefore power drain from V2 112, regardless of the voltage potentials of V1 110 and V2 112.

Figure 3:
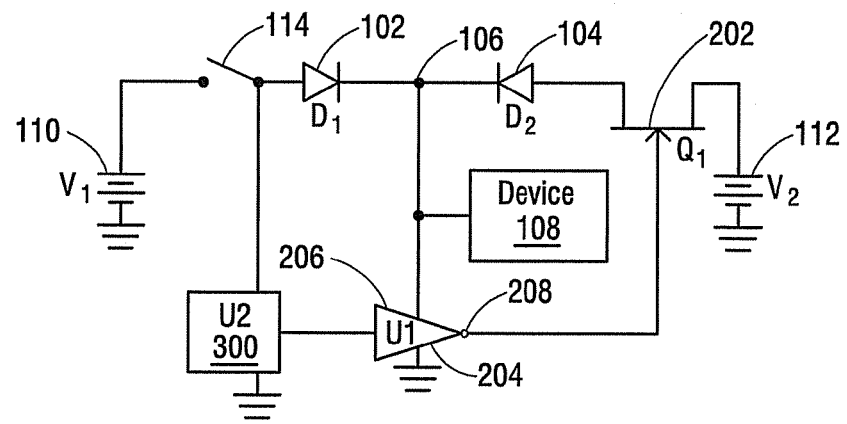
FIG. 3 illustrates a reset capability of the present invention which isolates the input of the controlling inverter from unwanted perturbations during powerup.
Figure 4:
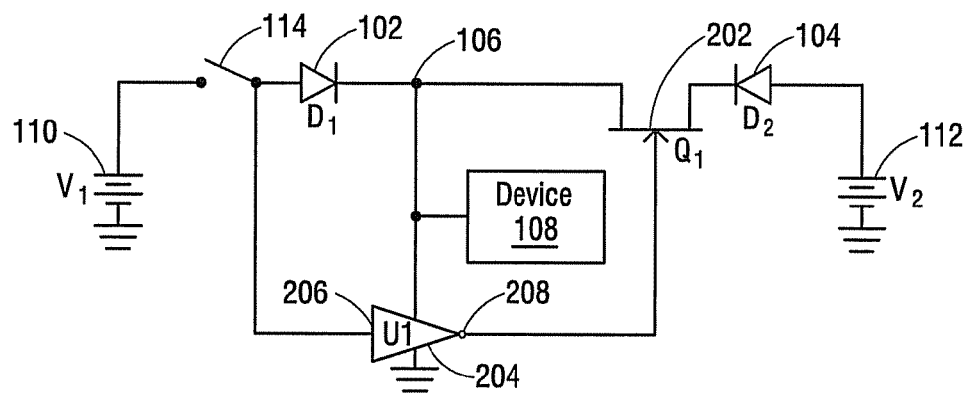
FIG. 4 illustrates another switching circuitry in accordance with the present disclosure.

As alternatives to an n-channel depletion mode FET described herein, p-channel FET devices, or enhancement mode devices of either charge carrier can be used. For example, a p-channel enhancement mode FET can be substituted for Q1 202 as shown in FIGS. 2 and 3 without changing the circuitry. Further, an n-channel enhancement mode FET, or a p-channel depletion mode FET, can be used in the negative leg of V2 112 in place of Q1 202 to provide similar results to those shown in FIGS. 2 and 3. For low voltage swing applications, Q1 202 can be placed between D2 104 and common node 106, such as that shown in FIG. 4, which can remove the diode drop across D2 104 as a potential barrier. Such a configuration can allow V2 112 to be activated at lower voltages, since the diode drop across D2 104 may not have to be overcome.

The only constraints on Q1 202 is that Q1 202 draw much less current than is being sent to the device 108 when V2 112 is being used i.e., when Q1 202 is in the "on" condition, and that Q1 202's leakage current in the "off" condition, i.e., pinch-off, is so small as to not seriously affect V2 112's storage time. There are also other devices, other than the enhancement and depletion mode JFET that can perform the function of Q1 202, e.g., Metal-Oxide Semiconductor Field Effect Transistors (MOSFETs), Insulated Gate Field Effect Transistors (IGFETs), etc., that may or may not require the presence of U1 204 or other circuitry. The present disclosure is not limited to the use of a transistor Q1 as described herein.

FIG. 3 illustrates a reset capability of the present disclosure which isolates the input of the controlling inverter from unwanted perturbations during powerup.

Reset IC U2 300 allows the system 200 of the present disclosure to allow for cleaner transitions between V1 110 and V2 112 when V1 110 is turned on.

Applications of the Present Invention

In cellular telephones, PDAs, and laptop computers, many functions can be saved during powerdown or low power conditions. Many new functions, such as adding larger startup capabilities, GPS capabilities, etc. may require more memory to save additional data, clock timing, etc. which place additional burdens on the backup power supply.

In a GPS receiver, certain constant functions can be maintained even when the unit is turned off. Such functions include backup memory, time-keeping, etc. Maintaining such functions even when the system power, i.e., V1 110, is turned off, enable quicker position solutions after power up if the functions are maintained during power down states. Since many devices are now using low voltage main supplies, e.g., 1.8 volts, which are lower than the 3 volt batteries used for backup power, the present disclosure allows for the additional circuitry to be maintained even in a power down state while still preserving battery life.

Conclusion

By automatically disconnecting the backup battery of low power products in the presence of a preferred voltage supply source, the above disclosed apparatus allows low voltage products to maximize their backup battery lifetime when the backup battery voltage exceeds the supply voltage.

An apparatus in accordance with the disclosure comprises a field effect transistor, a first diode, a second diode, and an inverter. The field effect transistor is coupled to the secondary power source. The first diode is coupled between the field effect transistor and to a device to be powered, while the second diode is coupled between the primary power source and the device to be powered. The inverter is coupled to a gate of the field effect transistor, and maintains the field effect transistor in a pinched-off condition and prevents a current flow from the secondary power source when the primary power source is available.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

What is claimed is:

1. An apparatus for selectively providing power from a secondary power source, comprising:
    a field effect transistor, having a source coupled to the secondary power source;
    a first diode, coupled to a drain of the field effect transistor and to a device to be powered;
    a second diode, coupled to the primary power source and the device to be powered; and
    an inverter, coupled to the primary power source and to a gate of the field effect transistor, wherein the inverter maintains the field effect transistor in a pinched-off condition and prevents a current flow from the secondary power source whenever the primary power source is available.

2. The apparatus of claim 1, wherein the field effect transistor is a depletion mode field effect transistor.

3. The apparatus of claim 2, wherein the depletion mode field effect transistor is an n-channel depletion mode field effect transistor.

4. The apparatus of claim 1, wherein the field effect transistor is an enhancement mode field effect transistor.

5. The apparatus of claim 4, wherein the enhancement mode transistor is a p-channel enhancement mode field effect transistor.

6. An apparatus for selectively providing power from a secondary power source, comprising:
    a first diode, coupled between the primary power source and a device to be powered;
    a second diode, coupled to the secondary power source;
    a field effect transistor, having a source coupled to the second diode and a drain coupled to the first diode and the device to be powered; and
    an inverter, coupled to the primary power source and to a gate of the field effect transistor, wherein the inverter maintains the field effect transistor in a pinched-off condition and prevents a current flow from the secondary power source whenever the primary power source is available.

7. The apparatus of claim 6, wherein the field effect transistor is a depletion mode field effect transistor.

8. The apparatus of claim 7, wherein the depletion mode field effect transistor is an n-channel depletion mode field effect transistor.

9. The apparatus of claim 6, wherein the field effect transistor is an enhancement mode field effect transistor.

10. The apparatus of claim 9, wherein the enhancement mode transistor is a p-channel enhancement mode field effect transistor.

11. The apparatus of claim 1, further including a reset integrated circuit ("IC") coupled to the inverter.

12. The apparatus of claim 6, further including a reset IC coupled to the inverter.

* * * * *

UNITED STATES PATENT AND TRADEMARK OFFICE
CERTIFICATE OF CORRECTION

PATENT NO.       : 7,671,489 B1                                  Page 1 of 1
APPLICATION NO.  : 10/051726
DATED            : March 2, 2010
INVENTOR(S)      : Allan Paul Uy et al.

It is certified that error appears in the above-identified patent and that said Letters Patent is hereby corrected as shown below:

Column 3, line 42, "Specifics of the [Disclosure]" should read "Specifics of the Disclosure".

Signed and Sealed this
Fifteenth Day of March, 2011

David J. Kappos
*Director of the United States Patent and Trademark Office*